(12) United States Patent
Naik et al.

(10) Patent No.: US 11,602,989 B2
(45) Date of Patent: Mar. 14, 2023

(54) AXLE ASSEMBLY HAVING AN INTERAXLE DIFFERENTIAL UNIT

(71) Applicant: ArvinMeritor Technology, LLC, Troy, MI (US)

(72) Inventors: Mahesh Naik, Troy, MI (US); Ramesh Ranjan, Troy, MI (US); Dale Kwasniewski, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/673,218

(22) Filed: Feb. 16, 2022

(65) Prior Publication Data

US 2022/0402360 A1 Dec. 22, 2022

(30) Foreign Application Priority Data

Jun. 21, 2021 (IN) .............................. 202111027684

(51) Int. Cl.
*B60K 17/36* (2006.01)
*F16H 48/24* (2006.01)
*F16H 48/08* (2006.01)

(52) U.S. Cl.
CPC ............. *B60K 17/36* (2013.01); *F16H 48/08* (2013.01); *F16H 48/24* (2013.01); *F16H 2048/082* (2013.01)

(58) Field of Classification Search
CPC ........ B60K 17/344–3465; B60K 17/36; F16H 48/24; F16H 48/08–2048/087
See application file for complete search history.

(56) References Cited

U.S. PATENT DOCUMENTS

| 4,077,279 A * | 3/1978 | Goscenski, Jr. ........ F16H 48/22 475/231 |
| 4,787,471 A * | 11/1988 | Kobayashi ......... B60K 17/3462 477/181 |
| 7,291,083 B2 * | 11/2007 | Almaguer .............. B60K 17/36 475/221 |
| 8,398,520 B1 | 3/2013 | Bassi et al. |
| 8,876,649 B2 * | 11/2014 | Uchida ................. F16D 1/0858 475/248 |
| 9,410,605 B2 | 8/2016 | Kluck |
| 9,506,549 B2 | 11/2016 | Chandrashekar et al. |
| 9,719,563 B2 | 8/2017 | Hirao |
| 9,816,603 B2 | 11/2017 | Hayes et al. |

(Continued)

FOREIGN PATENT DOCUMENTS

| CN | 110529577 A * | 12/2019 |
| CN | 112664636 A | 4/2021 |
| EP | 3095634 A2 | 11/2016 |

OTHER PUBLICATIONS

Melekian et al.; U.S. Appl. No. 17/196,178, filed Mar. 9, 2021; 26 Pages.

(Continued)

*Primary Examiner* — Huan Le
*Assistant Examiner* — James J Taylor, II
(74) *Attorney, Agent, or Firm* — Brooks Kushman PC (57) ABSTRACT

An axle assembly having an input shaft, an output shaft, and an interaxle differential unit. The interaxle differential unit includes a first side gear, a second side gear, a spider, at least one pinion gear, and a case. The case encircles the first side gear and the spider and has an integral drive gear.

20 Claims, 9 Drawing Sheets

(56) References Cited

U.S. PATENT DOCUMENTS

| | | |
|---|---|---|
| 10,113,628 B2 | 10/2018 | Kluck et al. |
| 10,156,289 B2 | 12/2018 | De Stefani et al. |
| 10,208,846 B2 | 2/2019 | Chinitz |
| 10,364,872 B2 | 7/2019 | Keeney et al. |
| 10,369,885 B2 | 8/2019 | Keeney et al. |
| 10,378,634 B2 | 8/2019 | Kluck et al. |
| 10,539,218 B2 | 1/2020 | Annigeri et al. |
| 10,703,202 B2 | 7/2020 | Funderburg et al. |
| 2021/0291644 A1 | 9/2021 | Hayes et al. |

OTHER PUBLICATIONS

Extended European Search Report dated Oct. 27, 2022 for related European Appln. No. 22178372.3 10 Pages.

* cited by examiner

AXLE ASSEMBLY HAVING AN INTERAXLE DIFFERENTIAL UNIT

TECHNICAL FIELD

This relates to an axle assembly having an interaxle differential unit.

BACKGROUND

An axle assembly having an interaxle differential unit is disclosed in U.S. Pat. No. 9,816,603.

SUMMARY

In at least one embodiment, an axle assembly is provided. The axle assembly includes an input shaft, an output shaft, and an interaxle differential unit. The input shaft and the output shaft are rotatable about an axis. The interaxle differential unit includes a first side gear, a second side gear, a spider, at least one pinion gear, and a case. The first side gear is rotatable about the axis and is selectively couplable to the input shaft. The second side gear is rotatable about the axis with the output shaft. The spider is rotatable about the axis with the input shaft. The pinion gear is rotatably disposed on the spider and meshes with the first side gear and the second side gear. The case encircles the first side gear and the spider and has an integral drive gear that has teeth that extend away from the axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
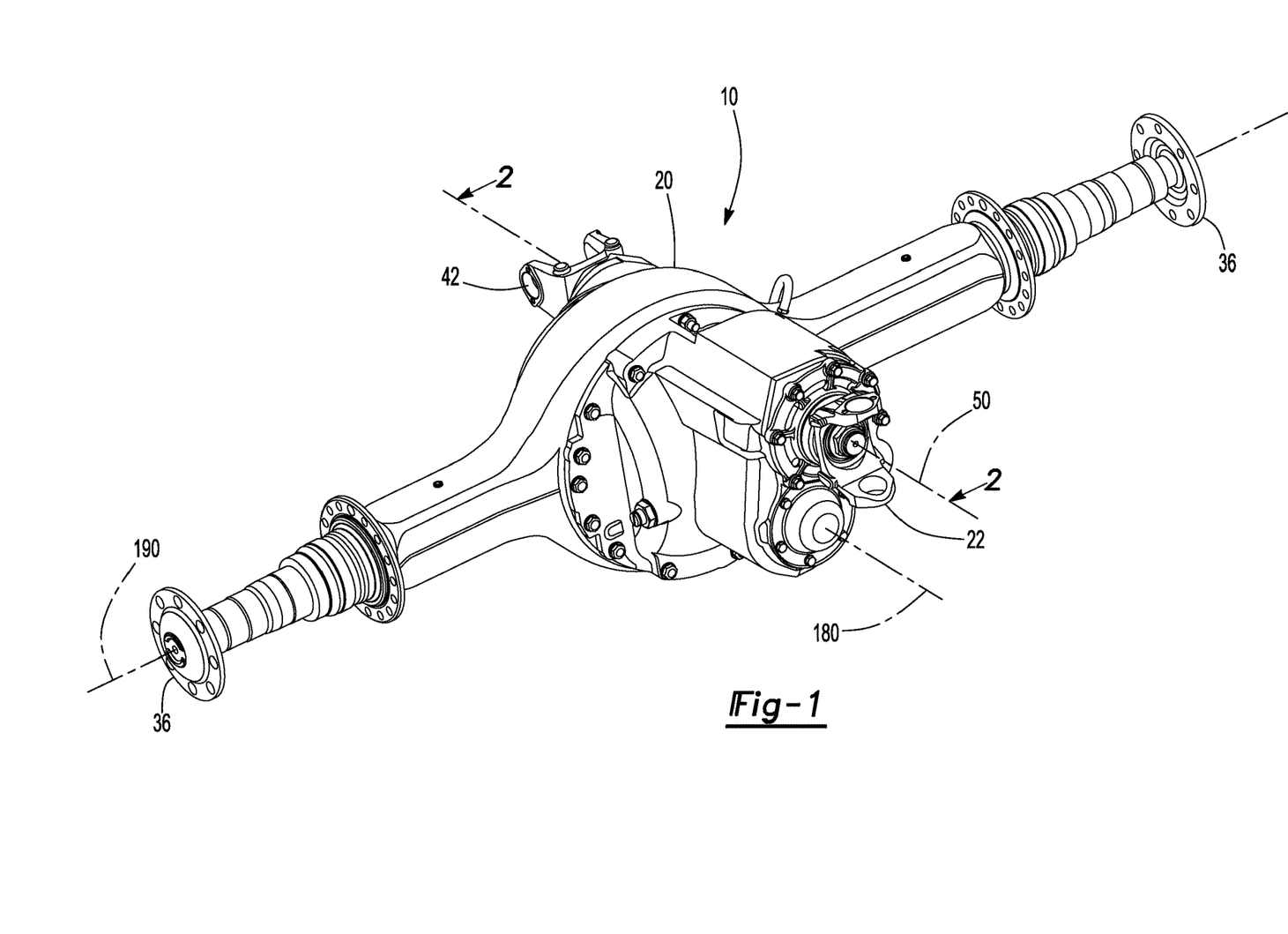
FIG. 1 is a perspective view of an example of an axle assembly.

Referring to FIG. 1, an example of an axle assembly 10 is shown. The axle assembly 10 may be provided with a vehicle of any suitable type, such as a truck, bus, farm equipment, military transport or weaponry vehicle, or cargo loading equipment for land, air, or marine vessels.

The axle assembly 10 may be part of a vehicle drivetrain that may include multiple axle assemblies that may be connected in series. For instance, the axle assembly 10 may be part of a tandem axle drivetrain configuration that may include two axle assemblies connected in series. The axle assembly 10 that is operatively connected to at least one torque source, such as an electric motor or an internal combustion engine, or that is disposed closest to a torque source may be referred to as a first axle assembly. The axle assembly that receives propulsion torque from the torque source through or by way of the first axle assembly may be referred to as a second axle assembly. In FIG. 1, the axle assembly 10 is depicted as being a first axle assembly.

The axle assembly 10 may provide torque to its associated wheel assemblies and may provide torque to the second axle assembly. In at least one configuration and as is best shown with reference to FIG. 2, the axle assembly 10 may include a housing 20, an input yoke 22, an input shaft 24, an interaxle differential unit 26, a clutch collar 28, a driven gear 30, a drive pinion 32, a differential assembly 34, at least one axle shaft 36, an output shaft 40, an output yoke 42, or combinations thereof.

Figure 2:
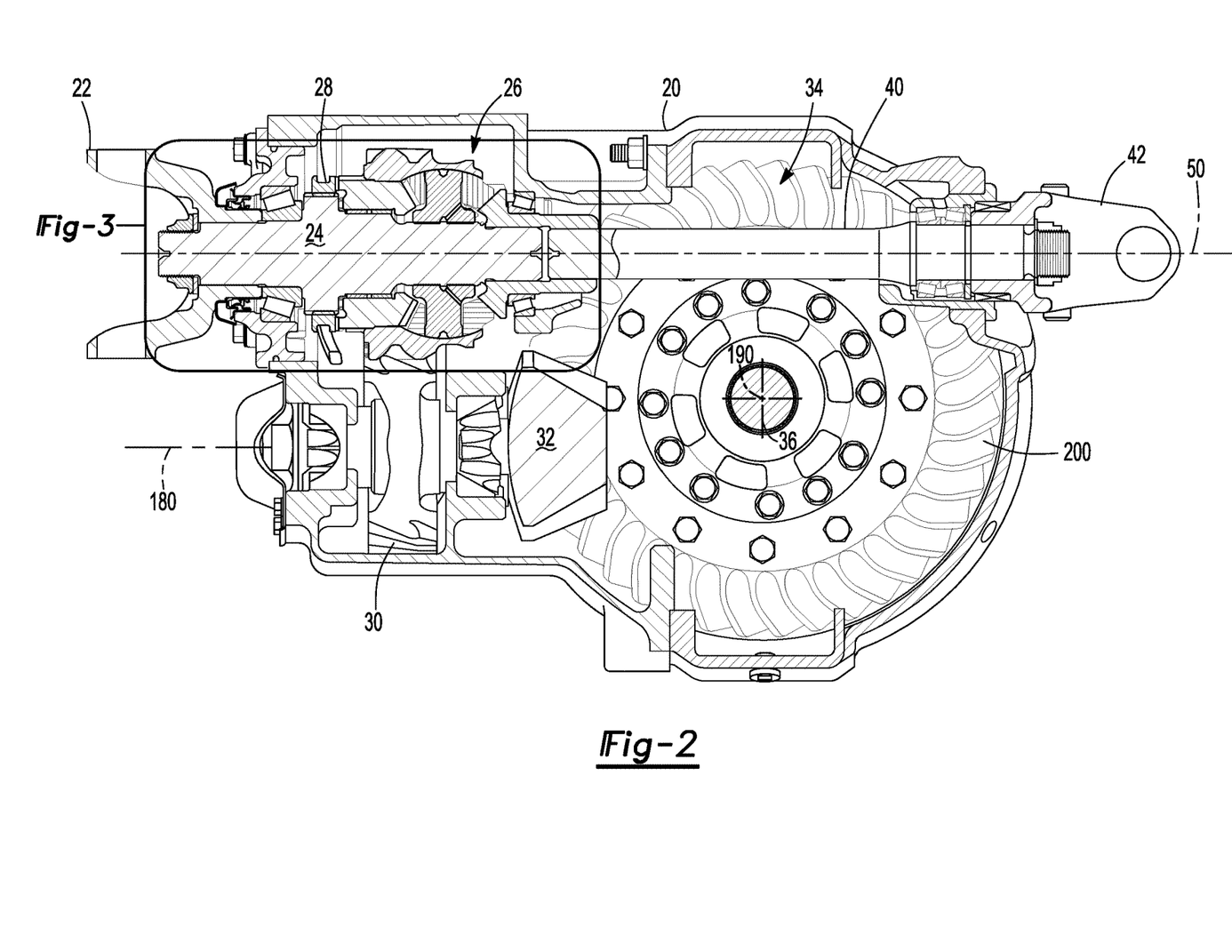
FIG. 2 is a section view of the axle assembly along section line 2-2.

Referring to FIGS. 1 and 2, the housing 20 may receive various components of the axle assembly 10. In addition, the housing 20 may facilitate mounting of the axle assembly 10 to the vehicle.

The input yoke 22, if provided, may facilitate coupling of the axle assembly 10 to a torque source. It is contemplated that the input yoke 22 may be omitted, such as when a torque source like an electric motor is integrated with the axle assembly 10. If provided, the input yoke 22 may be operatively connected to the input shaft 24.

Figure 3:
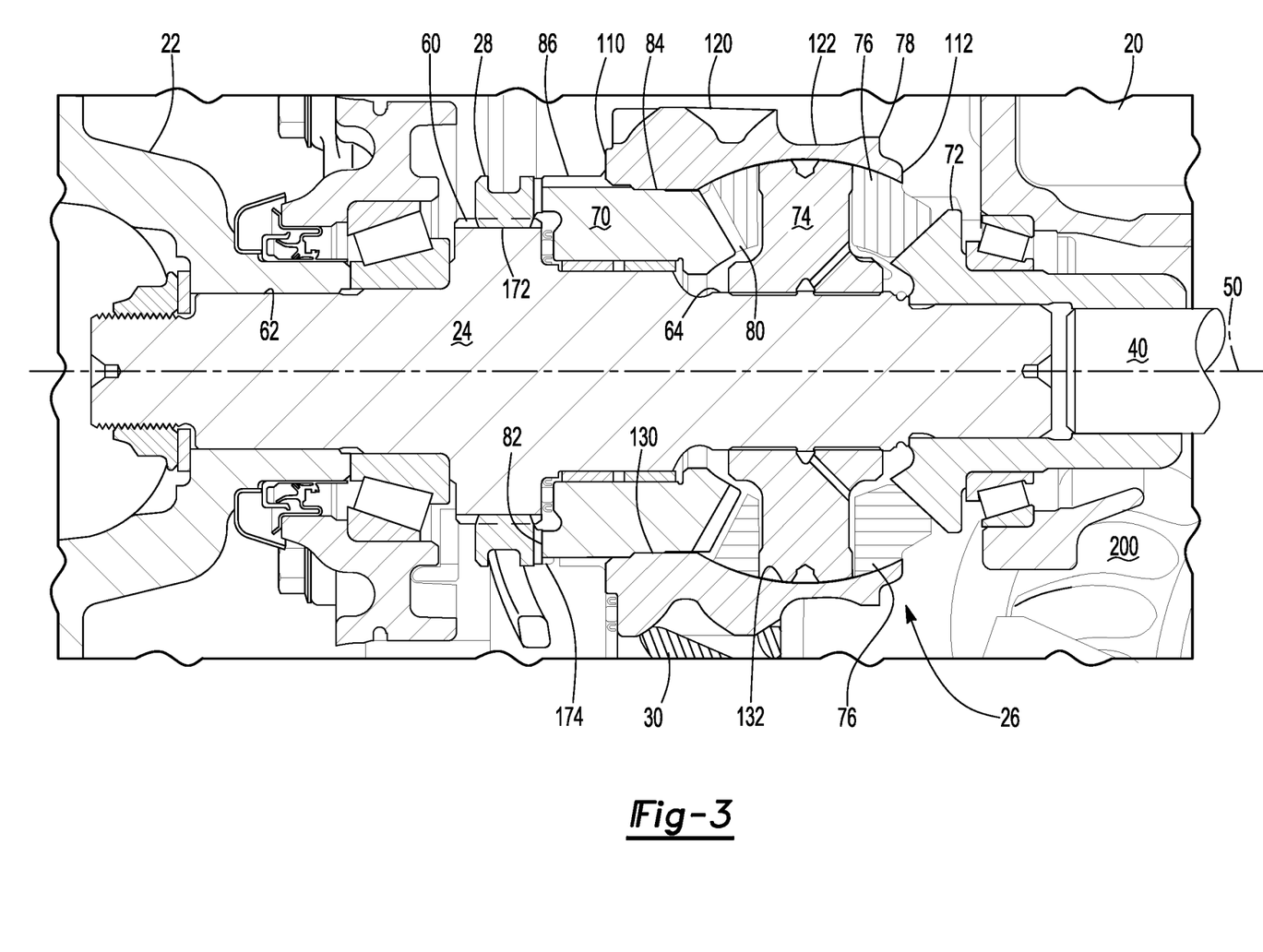
FIG. 3 is a magnified view of a portion of FIG. 2 showing an example of an interaxle differential unit.
Figure 4:
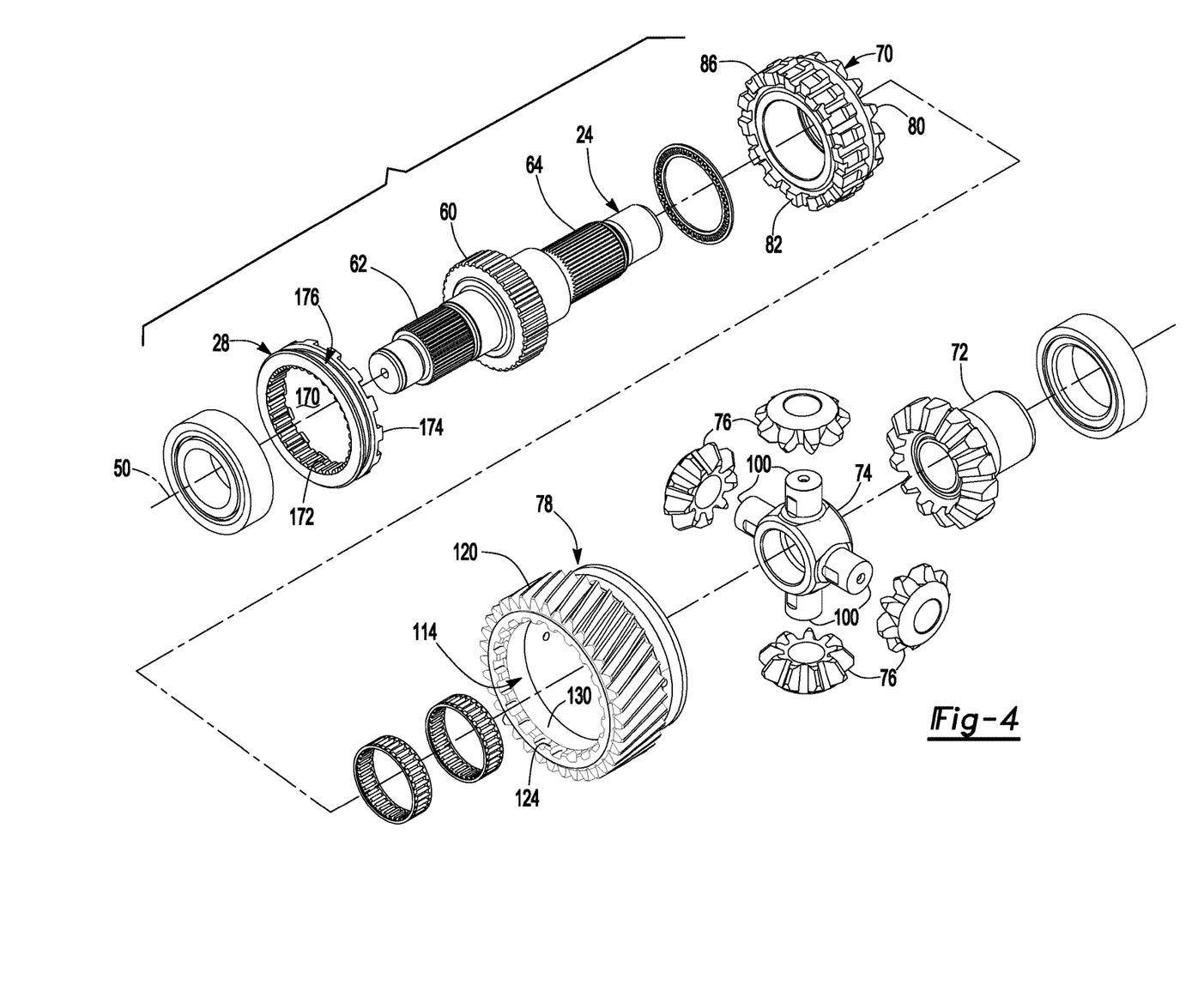
FIGS. 4 and 5 are exploded views that include the interaxle differential unit.
Figure 5:
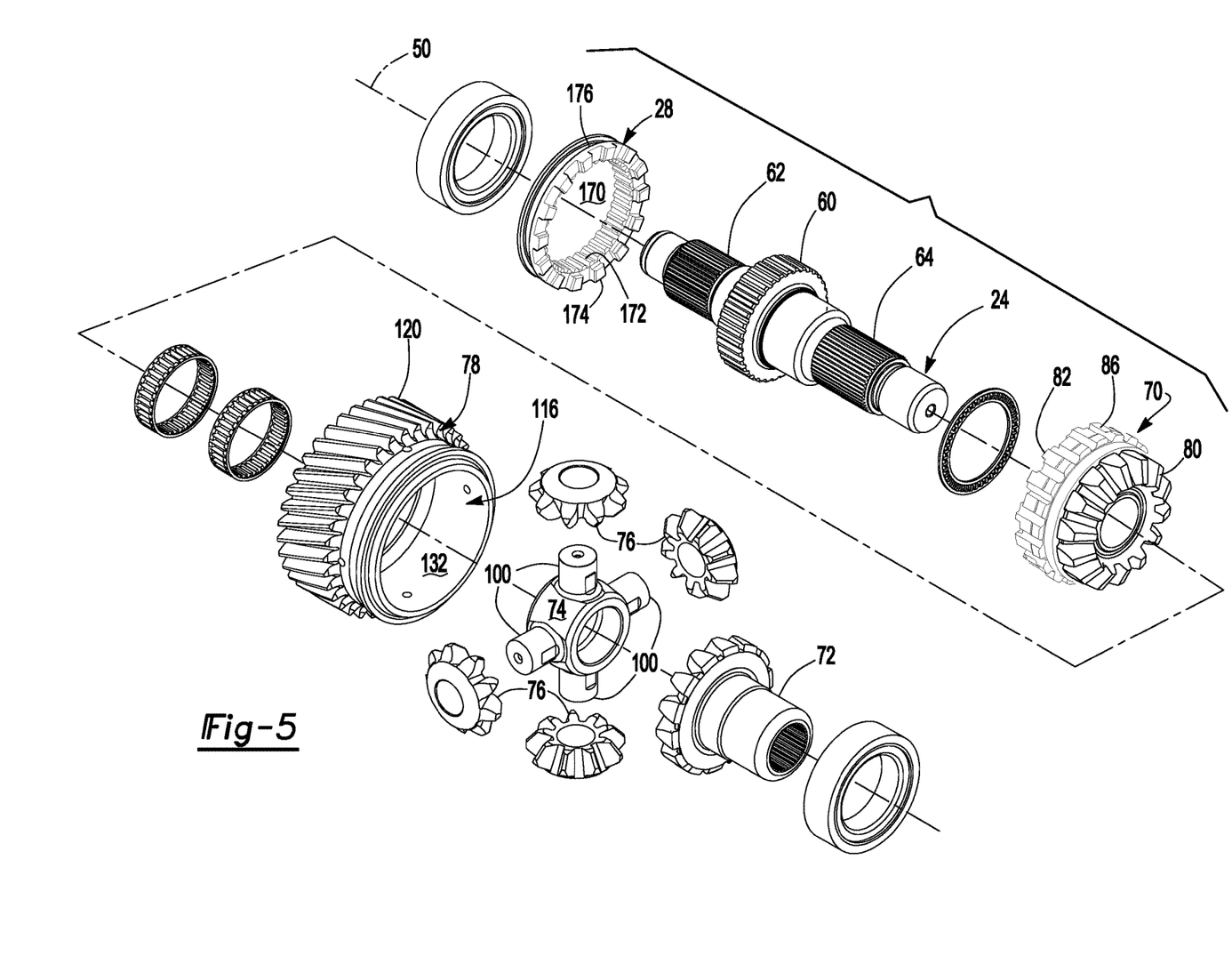

Referring primarily to FIGS. 3-5, an example of an input shaft 24 is shown. The input shaft 24 may extend along and may be rotatable about an axis 50. For example, the input shaft 24 may be rotatably supported by one or more bearings that may be disposed on the housing 20. The input shaft 24 may be operatively connected to the driven gear 30 and the output shaft 40 via the interaxle differential unit 26. In at least one configuration and as is best shown in FIGS. 4 and 5, the input shaft 24 may include at least one spline, such as a first spline 60, a second spline 62, a third spline 64, or combinations thereof. A spline may have teeth that may be arranged around the axis 50, may extend away from the axis 50, may be disposed substantially parallel to the axis 50, or combinations thereof. The term "substantially parallel" as used herein means the same as or very close to parallel and includes features or axes that are within ±2° of being parallel each other.

The first spline 60 may engage the clutch collar 28 such that the clutch collar 28 may be rotatable about the axis 50 with the input shaft 24. Moreover, the first spline 60 may permit the clutch collar 28 to move in an axial direction or a direction that extends along the axis 50 with respect to the input shaft 24.

The second spline 62, if provided, may engage the input yoke 22. For instance, the second spline 62 may mate or mesh with a corresponding spline of the input yoke 22 such that the input yoke 22 may be rotatable about the axis 50 with the input shaft 24.

The third spline 64, if provided, may engage a spider of the interaxle differential unit 26 as will be discussed in more detail below.

Referring primarily to FIGS. 2 and 3, an example of an interaxle differential unit 26 is shown. The interaxle differential unit 26 may accommodate or compensate for rotational speed differences between different drive axle assemblies, such as speed differences between the axle assembly 10 and a second axle assembly that is connected in series with the axle assembly 10. As an example, the interaxle differential unit 26 may operatively connect the input shaft 24 and the output shaft 40 and may allow the input shaft 24 and output shaft 40 to rotate at different speeds with respect to each other under various operating conditions. The interaxle differential unit 26 may be provided in various locations. In FIG. 2, the interaxle differential unit 26 is disposed inside the housing 20 on the input shaft 24; however, it is contemplated that the interaxle differential unit 26 may be provided in other locations, such as closer to the output yoke 42 or with the second axle assembly. It is also contemplated that interaxle differential unit 26 may be disposed on another shaft. In at least one configuration, the interaxle differential unit 26 may include a first side gear 70, a second side gear 72, a spider 74, at least one pinion gear 76, and a case 78.

Referring to FIGS. 3-6, the first side gear 70 may be rotatable about the axis 50. In addition, the first side gear 70 may be selectively coupled to the input shaft 24. The first side gear 70 may be disposed proximate the input shaft 24. For example, the first side gear 70 may extend along the axis 50 and may have a center bore that may receive or encircle the input shaft 24 and optionally one or more bearings that may rotatably support the first side gear 70 on the input shaft 24. In at least one configuration, the first side gear 70 may include side gear teeth 80, face gear teeth 82, an outer side 84, and optionally a first side gear spline 86.

The side gear teeth 80 may be arranged around the axis 50 and may mate or mesh with the teeth of at least one pinion gear 76. The side gear teeth 80 may be disposed inside the case 78.

The face gear teeth 82 may be disposed proximate a first end of the first side gear 70 that may face away from the spider 74. For instance, the face gear teeth 82 may be disposed on an opposite side of the first side gear 70 from the side gear teeth 80. The face gear teeth 82 may be disposed outside of the case 78 and may extend toward the clutch collar 28. The face gear teeth 82 may be selectively engaged by the clutch collar 28 as will be discussed in more detail below.

The outer side 84 may face away from the axis 50. In at least one configuration, the outer side 84 may encircle the axis 50 and may be disposed at a substantially constant radial distance from the axis 50. The outer side 84 may extend axially from the side gear teeth 80 toward the face gear teeth 82. The case 78 may engage or contact the outer side 84.

Figure 6:
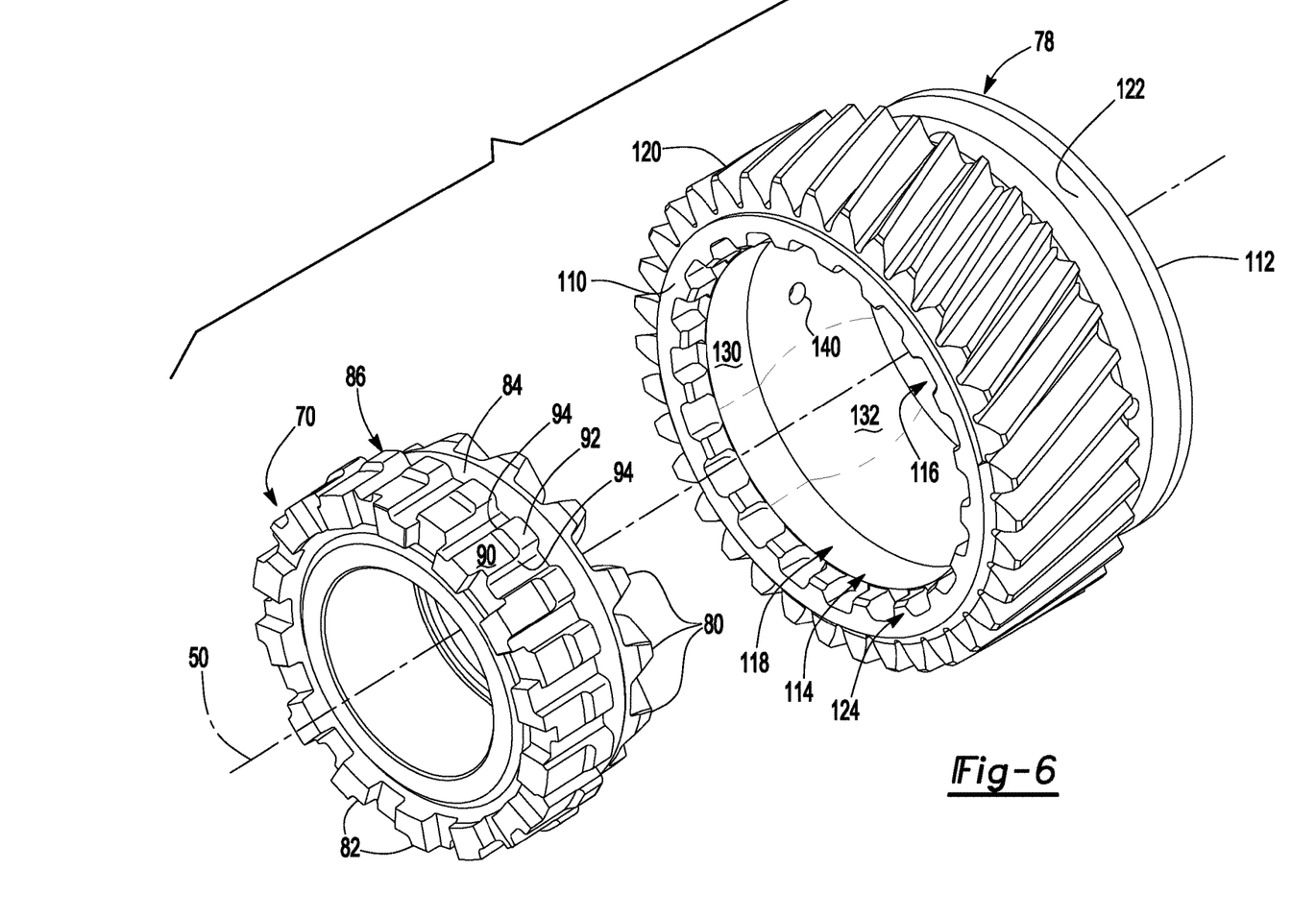
FIG. 6 is an exploded perspective view of a first side gear and a case of the interaxle differential unit, the case having an integral drive gear.

The first side gear spline 86 may have spline teeth that may be arranged around the axis 50 and that may extend away from the axis 50. For instance, the teeth of the first side gear spline 86 may be spaced apart from each other, may extend substantially parallel to the axis 50, and may extend from the first end of the first side gear 70 toward the side gear teeth 80. As is best shown in FIG. 6, one or more teeth of the first side gear spline 86 may intersect or extend from at least one of the face gear teeth 82. In some instances, a face gear tooth 82 may extend from a first tooth of the first side gear spline 86 to a second tooth of the first side gear spline 86 that may be disposed adjacent to the first tooth. One or more teeth of the first side gear spline 86 may have a tip surface 90 and a protrusion 92.

The tip surface 90 may face away from the axis 50 and may extend between opposing flanks 94 of a tooth of the first side gear spline 86. Optionally, the tip surface 90 may intersect and may partially define one or more face gear teeth 82 depending on the rotational position of the face gear teeth 82 with respect to the teeth of the first side gear spline 86.

The protrusion 92 may extend from the tip surface 90 in a direction that extends away from the axis 50. The protrusion 92 may be disposed proximate an end of a tooth of the first side gear spline 86 that may be disposed opposite or may face away from the face gear teeth 82. The protrusion 92 may be received inside the case 78 and may engage the case 78.

Referring to FIGS. 3-5, the second side gear 72 may be rotatable about the axis 50 with the output shaft 40. For example, the second side gear 72 may extend along the axis 50 and may have a center bore that may receive or encircle an end of the output shaft 40 and optionally an end of the input shaft 24. The center bore may also include a spline or splined portion that may be spaced apart from the input shaft 24 and that may mate with a corresponding spline of another shaft, such as the output shaft 40. As such, the second side gear 72 may be inhibited from rotating about the axis 50 with respect to the output shaft 40.

The spider 74 may be rotatable about the axis 50 with the input shaft 24. For instance, the spider 74 may include a center bore that may include a spline or splined portion that may mate with a corresponding spline of the input shaft 24, such as the third spline 64, to help inhibit the spider 74 from rotating about the axis 50 with respect to the input shaft 24. The spider 74 and the case 78 may be rotatable with respect to each other. For instance, the spider 74 may be partially or completely received inside the case 78 and may be rotatable about the axis 50 with respect to the case 78. The spider 74 may also include one or more pins 100 that may extend away from the center bore of the spider 74.

One or more pinion gears 76 may be rotatable with respect to the spider 74. A pinion gear 76 may be rotatably disposed on a pin 100 of the spider 74. For instance, the pinion gear 76 may define a hole that may receive a corresponding pin 100 in a manner that permits the pinion gear 76 to rotate about the pin 100. The pinion gear 76 may mesh with the first side gear 70 and the second side gear 72. For instance, the pinion gear 76 may include teeth that may mesh or mate with the side gear teeth 80 of the first side gear 70 and may mesh or mate with teeth of the second side gear 72.

Referring to FIGS. 3-6, the case 78 may receive components of the interaxle differential unit 26. For instance, the case 78 may encircle at least a portion of the first side gear 70, the second side gear 72, the spider 74, the pinion gears 76, or combinations thereof. The case 78 may be a single unitary one-piece component and may not be an assembly of multiple parts. In at least one configuration and as is best shown with reference to FIGS. 3 and 6, the case 78 may have a first case end 110, a second case end 112, a first opening 114, a second opening 116, a case cavity 118, an integral drive gear 120, a concave groove 122, or combinations thereof. The case 78 may also include a case spline 124.

The first case end 110 may face toward the first side gear 70 or to the left from the perspective shown in FIG. 3. The first case end 110 may extend around the axis 50 and may encircle the first opening 114.

The second case end 112 may be disposed at an opposite end of the case 78 from the first case end 110. As such, the second case end 112 may face away from the first side gear 70. The second case end 112 may extend around the axis 50 and may encircle the second opening 116.

Referring to FIG. 6, the first opening 114 may extend around the axis 50 and may be encircled by the first case end 110. The first opening 114 may receive and may encircle the first side gear 70. In at least one configuration, the first opening 114 may have a smaller diameter than the second opening 116.

The second opening 116 may be disposed at an opposite end of the case 78 from the first opening 114. The second opening 116 may extend around the axis 50 and may be encircled by the second case end 112. The second opening 116 may receive and may encircle the second side gear 72, pinion gear 76, or combinations thereof.

The case cavity 118 may receive components of the interaxle differential unit 26. In at least one configuration, the case cavity 118 may be at least partially defined by an internal surface 130 and a part-spherical surface 132.

The internal surface 130 may extend between the first case end 110 and the part-spherical surface 132. The internal surface 130 may face toward the axis 50 and may encircle the first side gear 70. The internal surface 130 or portion thereof may be radially disposed with respect to the axis 50.

The part-spherical surface 132 may extend from the second case end 112 toward or to the internal surface 130. The part-spherical surface 132 may face toward the axis 50 and may encircle the spider 74 and at least a portion of the pinion gear 76. Optionally, the part-spherical surface 132 may encircle a portion of the first side gear 70, the second side gear 72, or both. The part-spherical surface 132 may extend continuously around the axis 50 and may be disposed at a substantially constant radial distance from a center point that may be positioned along the axis 50. For instance, the part-spherical surface 132 may resemble a portion of a sphere and may extend around a spherical segment, which may be a portion of a sphere that may be disposed between two substantially parallel planes that may be disposed substantially perpendicular to the axis 50. The term "substantially perpendicular" is used herein to designate features or axes that are the same as or very close to perpendicular and includes features that are within ±2° of being perpendicular each other.

The integral drive gear 120 may have teeth that may be arranged around the axis 50 and that may extend away from and face away from the axis 50. The teeth of the integral drive gear 120 may mate or mesh with teeth of driven gear 30. The integral drive gear 120 may be part of the case 78. As such, the integral drive gear 120 and the case 78 may be rotatable together about the axis 50 such that the integral drive gear 120 may not be rotatable with respect to the case 78. In at least one configuration, the integral drive gear 120 may be disposed closer to the first case end 110 than to the second case end 112. For instance, the integral drive gear 120 may be disposed adjacent to the first case end 110 and may be spaced apart from the second case end 112. As such, the integral drive gear 120 may generally be disposed opposite the internal surface 130 and may encircle a portion of the first side gear 70, the spider 74, the pinion gear 76, or combinations thereof.

Figure 9:
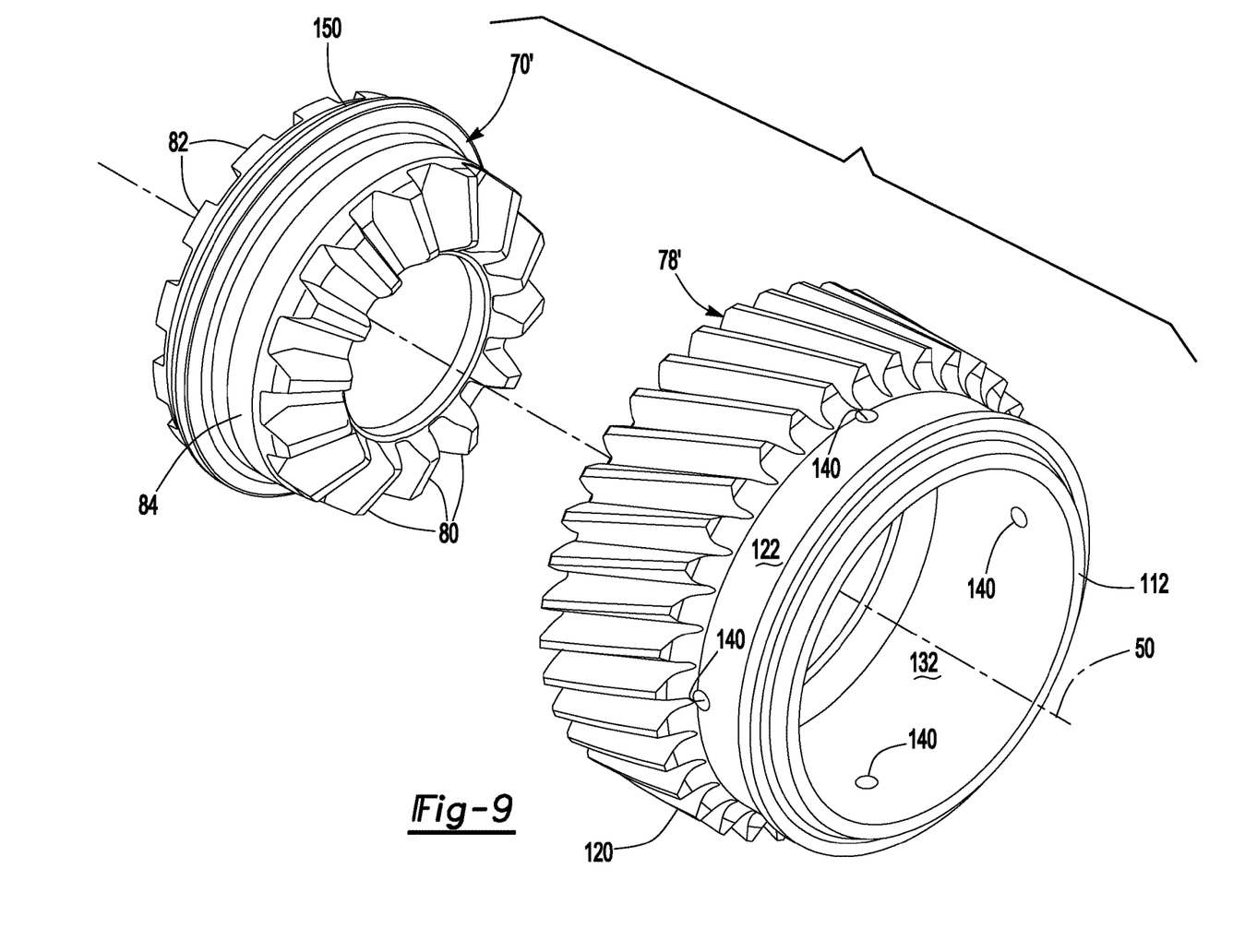

Referring primarily to FIGS. 6 and 9, the concave groove 122 may be disposed on a side of the case 78 that may face away from the axis 50. The concave groove 122 may encircle the axis 50 and may be concave or have a concave cross-section with respect to the axis 50. The concave groove 122 may extend between the integral drive gear 120 and the second case end 112. In at least one configuration, the concave groove 122 may encircle the spider 74. One or more through holes 140 may be provided with the concave groove 122. The through holes 140 may extend from the concave groove 122 toward the axis 50 and may facilitate the distribution of lubricant.

The case 78 may be fixedly coupled to the first side gear 70. As such, the first side gear 70 may not be rotatable with respect to the case 78 and its integral drive gear 120. The case 78 and the first side gear 70 may be coupled in any suitable manner. In the configuration shown in FIGS. 3-6, the first side gear 70 is coupled to the case 78 with mating splines. In the configuration shown in FIGS. 7-9, the first side gear 70 is welded to the case 78.

Referring to FIGS. 3-6, the case 78 may include a case spline 124. The case spline 124 may include a plurality of teeth that may be arranged around the axis 50 and that may extend toward the axis 50. The teeth of the case spline 124 may extend from the first case end 110 toward the second case end 112. For instance, the case spline 124 may extend from the first case end 110 to the internal surface 130. As such, the case spline 124 or a portion thereof may be disposed opposite the integral drive gear 120 and the integral drive gear 120 may encircle at least a portion of the first side gear spline 86. For instance, the integral drive gear 120 may encircle the protrusion 92 but may not encircle all of or the remainder of the first side gear spline 86. The teeth of the case spline 124 may mate or mesh with the teeth of the first side gear spline 86 to inhibit rotation of the first side gear 70 about the axis 50 with respect to the case 78. For instance, the case spline 124 may engage and may receive a protrusion 92 of the first side gear spline 86.

Figure 7:
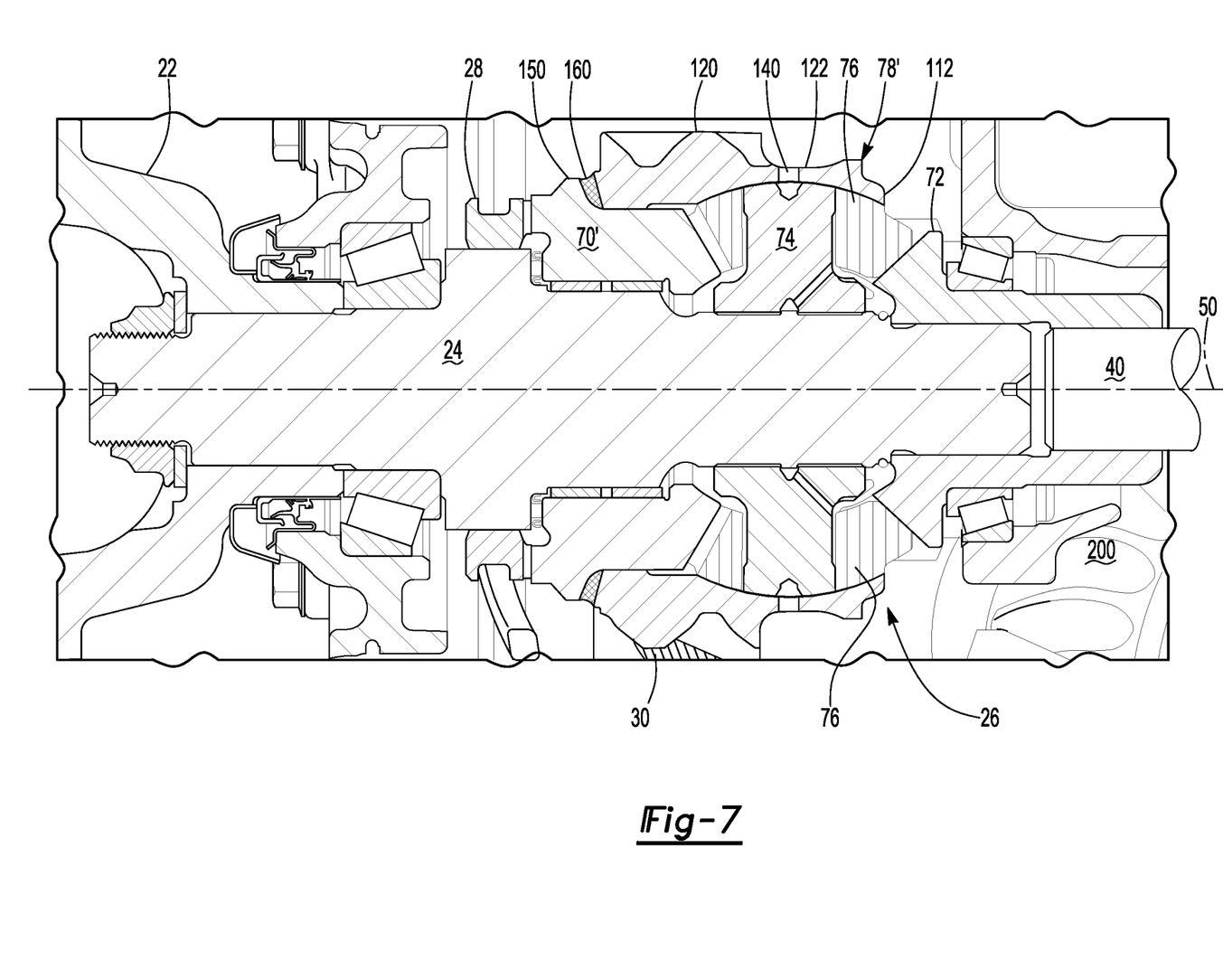
FIG. 7 is a magnified section view showing another example of a first side gear and a case with an integral drive gear that may be provided with the interaxle differential unit.
Figure 8:
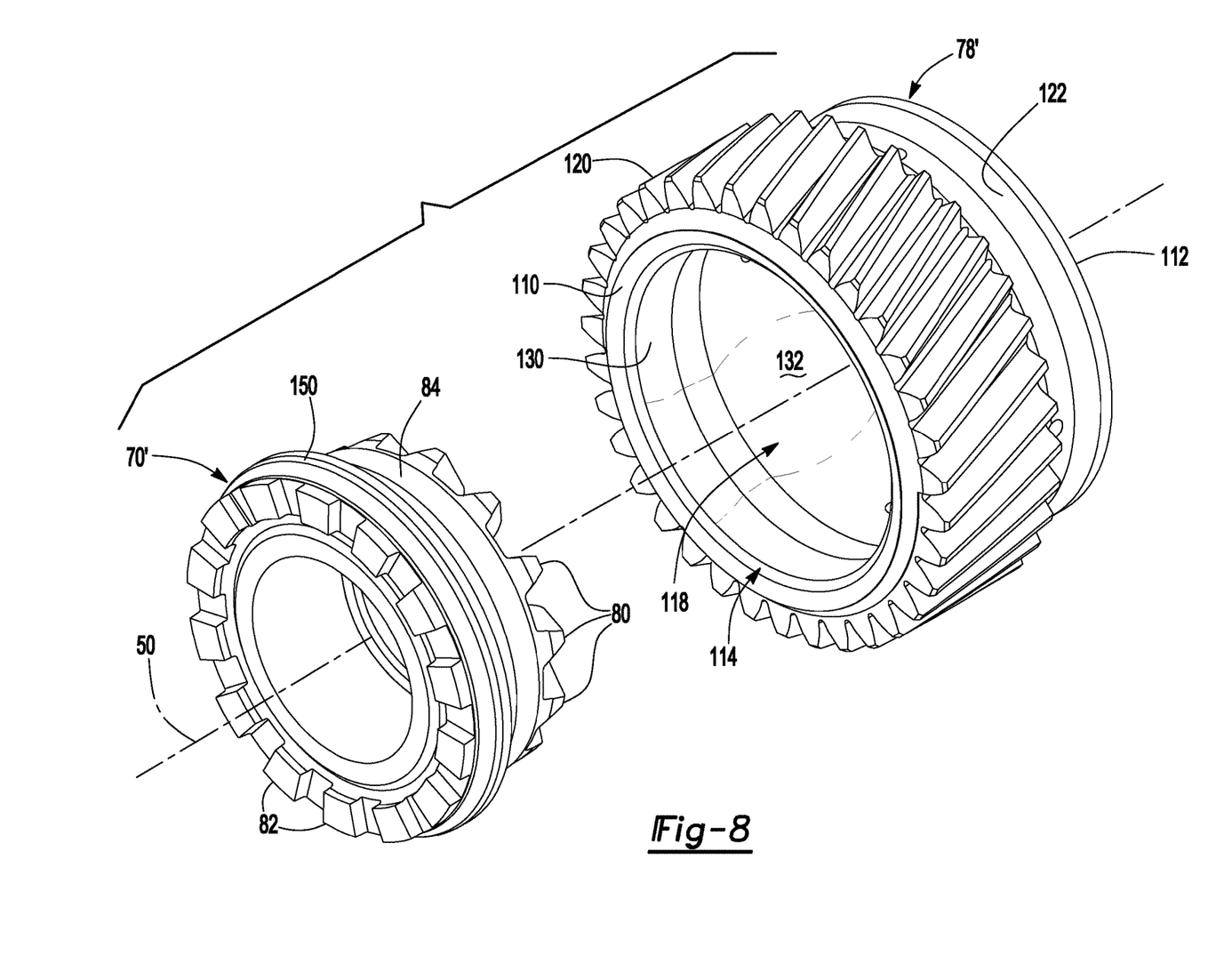
FIGS. 8 and 9 are perspective views of the first side gear and the case of FIG. 7.

Referring to FIGS. 7-9, another configuration of the interaxle differential unit is shown in which the first side gear is welded to the case. In this configuration, the first side gear is referenced with number 70' and the case is referenced with number 78'. The interaxle differential unit may have a second side gear 72, a spider 74, and at least one pinion gear 76 as previously described.

The first side gear 70' may be the same as previously described but may replace the first side gear spline 86 with a first side gear protrusion 150. The first side gear protrusion 150 may be axially positioned between the first end of the first side gear 70' and the side gear teeth 80. For instance, the first side gear protrusion 150 may extend axially from the face gear teeth 82 to the outer side 84. The first side gear protrusion 150 may extend or protrude away from the axis 50 further than the side gear teeth 80, the face gear teeth 82, or both. In addition, the first side gear protrusion 150 may encircle the axis 50. The outer side 84 may extend from the side gear teeth 80 to the first side gear protrusion 150.

The case 78' may be the same as that previously described but may omit the case spline 124. The internal surface 130 may extend from the first case end 110 to the part-spherical surface 132.

Referring to FIG. 7, a weld 160 may attach the first side gear 70' to the case 78'. The weld 160 may extend from the first side gear protrusion 150 of the first side gear 70' to the first case end 110 of the case 78'. In at least one configuration, the weld 160 may be oriented at an oblique angle with respect to the axis 50 and may extend continuously or discontinuously around the axis 50.

Referring to FIGS. 3-5, the clutch collar 28, if provided, may be rotatable about the axis 50 with the input shaft 24. In addition, the clutch collar 28 may be moveable along the axis 50 to engage or disengage a first side gear 70, 70' of the interaxle differential unit 26. The clutch collar 28 may be disposed outside of the case 78, 78' of the interaxle differential unit 26 and may be separated from and may not be engageable with the case 78, 78' and its integral drive gear 120. In at least one configuration, the clutch collar 28 may be generally ring-shaped and may define a clutch collar hole 170, a clutch collar spline 172, a clutch collar face gear 174, and an annular groove 176.

Referring primarily to FIGS. 4 and 5, the clutch collar hole 170 may extend around the axis 50. The clutch collar hole 170 may receive the input shaft 24.

Referring primarily to FIGS. 3-5, the clutch collar spline 172 may be disposed in the clutch collar hole 170. The clutch collar spline 172 may include a plurality of spline teeth that may extend toward the axis 50 and that may mate or mesh with the teeth of the first spline 60 of the input shaft 24. As such, the clutch collar 28 may be rotatable about the axis 50 with the input shaft 24 and may be moveable along the axis 50 or moveable in an axial direction with respect to the input shaft 24.

The clutch collar face gear 174 may include a set of teeth that may be arranged around the axis 50 and that may face toward and extend toward the interaxle differential unit 26. The teeth of the clutch collar face gear 174 may selectively engage the teeth of a first side gear 70, 70' of the interaxle differential unit 26. For instance, the clutch collar 28 may move between an unlocked position and a locked position. The clutch collar face gear 174 may be disengaged from the face gear teeth 82 of the first side gear 70, 70' when the clutch collar 28 is in the unlocked position, thereby permitting the first side gear 70, 70' to rotate about the axis 50 with respect to the input shaft 24. The clutch collar face gear 174 may engage and mate or mesh with the face gear teeth 82 of the first side gear 70, 70' when the clutch collar 28 is in the locked position, thereby inhibiting the first side gear 70, 70' from rotating about the axis 50 with respect to the input shaft 24.

The annular groove 176, if provided, may receive a linkage, such as a fork, that may operatively connect the clutch collar 28 to an actuator that may position the clutch collar 28 along the axis 50.

Referring to FIG. 2, the driven gear 30 may be rotatable about a second axis 180. For example, the drive pinion 32 may be received in a center bore of the driven gear 30 and the driven gear 30 may be fixedly disposed on the drive pinion 32 or may be couplable to the drive pinion 32 such that the driven gear 30 and the drive pinion 32 may rotate together about the second axis 180. The driven gear 30 may include a plurality of teeth that may be generally arranged about an outside diameter of the driven gear 30 and that may mate or mesh with the teeth of the integral drive gear 120. The second axis 180 may be disposed substantially parallel to the axis 50.

The drive pinion 32 may help operatively connect the torque source to the differential assembly 34. The drive pinion 32 may be spaced apart from the input shaft 24 and may be configured to rotate about an axis, such as a second axis 180. The drive pinion 32 may be rotatable with the driven gear 30. A gear portion may be disposed at an end of the drive pinion 32.

The differential assembly 34 may be at least partially received in the housing 20. The differential assembly 34 may be rotatable about an axis, such as a differential axis 190 that may be disposed substantially perpendicular to the second axis 180. The differential assembly 34 may transmit torque to the axle shafts 36 and wheels. For example, the differential assembly 34 may be operatively connected to the axle shafts 36 and may permit the axle shafts 36 to rotate at different rotational speeds in a manner known by those skilled in the art. The differential assembly 34 may have a ring gear 200 that may have teeth that may mate or mesh with the teeth of the gear portion of the drive pinion 32.

Accordingly, the differential assembly 34 may receive torque from the drive pinion 32 via the ring gear 200 and transmit torque to the axle shafts 36.

Referring to FIGS. 1 and 2, the axle shafts 36 may transmit torque from the differential assembly 34 to corresponding wheel hubs and wheels. The axle shafts 36 may extend along and may be rotatable about an axis, which may be the differential axis 190. Each axle shaft 36 may have a first end and a second end. The first end may be operatively connected to the differential assembly 34. The second end may be disposed opposite the first end and may be operatively connected to a wheel.

Referring to FIG. 2, the output shaft 40 may extend along and may be rotatable about the axis 50. For instance, the output shaft 40 may be supported by one or more bearings that may be disposed on the housing 20. The output shaft 40 may be coupled to the interaxle differential unit 26. For example, the output shaft 40 may be fixedly coupled to the second side gear 72.

Referring to FIG. 1, the output yoke 42 may facilitate coupling of the axle assembly 10 to another axle assembly. For instance, the output yoke 42 may be fixedly coupled to the output shaft 40 in any suitable manner, such as with mating splines and a fastener like a nut. The output yoke 42 may be operatively connected to a second axle assembly in any suitable manner, such as via a prop shaft.

An axle assembly as described above may allow an interaxle differential unit to be provided with a case that has an integral drive gear. Such a configuration may help reduce the axial length of the interaxle differential unit and the input shaft, which in turn may reduce the overall length or "standout" of the housing and the axle assembly, thereby reducing package space and weight. An interaxle differential unit may be provided with fewer parts than other interaxle differential unit designs that are associated with a separate drive gear, which may help reduce assembly time and may help improve the reliability of the interaxle differential unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
an input shaft that is rotatable about an axis;
an output shaft that is rotatable about the axis; and
an interaxle differential unit that includes:
  a first side gear that is rotatable about the axis and is selectively couplable to the input shaft, wherein the first side gear includes a first side gear spline that has teeth that are arranged around the axis and that extend away from the axis;
  a second side gear that is rotatable about the axis with the output shaft;
  a spider that is rotatable about the axis with the input shaft;
  a pinion gear that is rotatably disposed on the spider and that meshes with the first side gear and the second side gear; and
  a case that encircles the first side gear and the spider, wherein the case has an integral drive gear that has teeth that face away from the axis and a case spline that has teeth that are arranged around the axis and that extend toward the axis and that mate with the teeth of the first side gear spline; and wherein at least one tooth of the first side gear spline has a tip surface that faces away from the axis and a protrusion that extends from the tip surface in a direction that extends away from the axis, wherein the protrusion is received inside the case and engages the case spline.

2. The axle assembly of claim 1 wherein the case and the integral drive gear are rotatable together about the axis such that the integral drive gear is not rotatable with respect to the case.

3. The axle assembly of claim 1 wherein the integral drive gear encircles the first side gear.

4. The axle assembly of claim 1 wherein the case is fixedly coupled to the first side gear such that the first side gear is not rotatable with respect to the case and the integral drive gear.

5. The axle assembly of claim 1 wherein the case has a first case end and a second case end that is disposed opposite the first case end, wherein the integral drive gear is disposed adjacent to the first case end and is spaced apart from the second case end.

6. The axle assembly of claim 1 wherein the case has a first case end and a second case end that is disposed opposite the first case end, wherein the case includes a concave groove that encircles the axis and that extends between the integral drive gear and the second case end.

7. The axle assembly of claim 6 wherein a through hole extends from the concave groove toward the axis.

8. The axle assembly of claim 1 wherein the integral drive gear encircles the protrusion and does not encircle a portion of the first side gear spline.

9. The axle assembly of claim 1 wherein the first side gear has a face gear that is disposed at a first end of the first side gear, wherein at least one tooth of the face gear extends from a first tooth of the first side gear spline to a second tooth of the first side gear spline.

10. An axle assembly comprising:
an input shaft that is rotatable about an axis;
an output shaft that is rotatable about the axis; and
an interaxle differential unit that includes:
a first side gear that is rotatable about the axis and is selectively couplable to the input shaft;
a second side gear that is rotatable about the axis with the output shaft;
a spider that is rotatable about the axis with the input shaft;
a pinion gear that is rotatably disposed on the spider and that meshes with the first side gear and the second side gear; and
a case that encircles the first side gear and the spider, wherein the case has an integral drive gear that has teeth that face away from the axis, the first side gear has a face gear that is disposed at a first end of the first side gear that faces away from the spider, and the first side gear includes a first side gear spline that has teeth that are arranged around the axis and that extend away from the axis, wherein at least one tooth of the face gear extends from a first tooth of the first side gear spline to a second tooth of the first side gear spline.

11. The axle assembly of claim 10 wherein the case has a case spline that has teeth that are arranged around the axis and that extend toward the axis and that mate with the teeth of the first side gear spline.

12. The axle assembly of claim 11 wherein at least one tooth of the first side gear spline has a tip surface that faces away from the axis and a protrusion that extends from the tip surface in a direction that extends away from the axis, wherein the protrusion is received inside the case and engages the case spline.

13. The axle assembly of claim 10 further comprising a clutch collar that is rotatable about the axis with the input shaft, wherein the clutch collar is selectively couplable with the face gear to inhibit rotation of the first side gear about the axis with respect to the input shaft.

14. The axle assembly of claim 13 wherein the clutch collar is separated from and not engageable with the case and the integral drive gear.

15. An axle assembly comprising:
an input shaft that is rotatable about an axis;
an output shaft that is rotatable about the axis; and
an interaxle differential unit that includes:
a first side gear that is rotatable about the axis and is selectively couplable to the input shaft, wherein the first side gear has a first side gear protrusion that protrudes away from the axis;
a second side gear that is rotatable about the axis with the output shaft;
a spider that is rotatable about the axis with the input shaft;
a pinion gear that is rotatably disposed on the spider and that meshes with the first side gear and the second side gear;
a case that encircles the first side gear and the spider, wherein the case has an integral drive gear that has teeth that face away from the axis; and
a weld that attaches the first side gear to the case, wherein the weld extends from the first side gear protrusion to a first case end of the case.

16. The axle assembly of claim 15 wherein the teeth of the integral drive gear mesh with a driven gear that is rotatable about a second axis with a drive pinion.

17. The axle assembly of claim 15 wherein the integral drive gear encircles a portion of the spider.

18. The axle assembly of claim 15 wherein the spider is rotatable with respect to the case.

19. The axle assembly of claim 15 wherein the first side gear protrusion encircles the axis.

20. The axle assembly of claim 19 wherein the first side gear further comprises an outer side that faces away from the axis and that extends axially from the first side gear protrusion toward the spider, wherein the case engages the outer side.

* * * * *